United States Patent [19]

Baskin

[11] 3,957,227

[45] May 18, 1976

[54] ROTOR PITCH CONTROL MECHANISM

[75] Inventor: Joseph M. Baskin, Bala Cynwyd, Pa.

[73] Assignee: The Boeing Company, Seattle, Wash.

[22] Filed: Feb. 10, 1975

[21] Appl. No.: 548,474

[52] U.S. Cl. ............................. 244/17.25; 416/167
[51] Int. Cl.² ........................................ B64C 27/52
[58] Field of Search ............... 244/17.25; 416/167, 416/168, 164

[56] References Cited
UNITED STATES PATENTS

| | | | |
|---|---|---|---|
| 2,234,196 | 3/1941 | Prewitt | 416/167 X |
| 3,092,186 | 6/1963 | MacLean | 416/167 X |

*Primary Examiner*—Trygve M. Blix
*Assistant Examiner*—Barry L. Kelmachter
*Attorney, Agent, or Firm*—Joseph M. Corr

[57] ABSTRACT

A rotor pitch control mechanism for use with bearingless helicopter rotors is disclosed. The disclosed mechanism eliminates the requirement for vertical motion of the pitch link, thus alleviates the bearingless rotor problem of flapwise motion of the rotor blade in response to pitch control actuator forces. Stabilizing pitch-flap coupling and blade flap restraint is provided.

4 Claims, 7 Drawing Figures

ROTOR PITCH CONTROL MECHANISM

BACKGROUND OF THE INVENTION

Helicopter rotors are usually so designed that the pitch of the rotor blade can be varied to produce different thrust levels. Recent rotor hub designs, and in particular rotor hub designs employing a flexible strap interconnecting the rotor blades, have introduced a new design constraint into the design of rotor pitch change mechanisms. Conventional rotor pitch change mechanisms, if used with a strapped rotor, produce an undesirable vertical movement of the rotor blade, because the root end of the rotor blade is not constrained against vertical motion. This vertical motion of the blade (heaving) results in long excursions of the associated pitch control mechanism, since much of the travel of the linkage is required simply to follow the blade movement.

SUMMARY OF THE INVENTION

The present invention overcomes the aforementioned problems of conventional pitch change mechanisms and also reduces the blade loading moments associated with the pitch change mechanism. Bearingless helicopter rotors which use a glass reinforced plastic strap for blade retention are now coming into use. The strap provides high inplane stiffness to the rotor assembly and negligible flapping stiffness, thus the blade root restraint is a cantilever in the inplane direction and a hinge in the flap direction. Blade pitch change results in the elastic twisting of the strap, which, because of high centrifugal force loads from the blade, has relatively high torsional stiffness.

If a conventional pitch change mechanism is used in conjunction with a strapped rotor, about one half of the pitch link travel is used to overcome the lost motion due to the resultant blade heaving. This means that the control actuator travel must be extended to accommodate this lost motion, or bellcranks must be employed to change mechanical advantage.

The subject invention eliminates the requirement for vertical motion of a pitch link, thus eliminating blade heave. Further, the subject pitch link change mechanism changes the planipetal moment contribution of the pitch arm and pitch link combination so that control loads are reduced.

The proposed rotor pitch change mechanism is so designed that it can also be employed as a blade flap restrainer. This dual use of the pitch change hardware is desirable since otherwise separate hardware would be required to obtain a flap restraint capability. The rotor pitch change mechanism is so designed that it produces positive pitch-flap coupling i.e. when the blade flaps a restoring pitch change is automatically induced by the pitch control linkage. This is accomplished by choosing a specific orientation of the pitch control linkage as discussed in detail below.

It is a primary object of this invention to provide a helicopter rotor pitch change mechanism for use with strapped rotors which does not introduce rotor blade heaving.

It is a further object of this invention to provide a helicopter rotor pitch change mechanism which reduces control excursions and control loads.

It is a further object of this invention to provide a rotor blade pitch control mechanism which can also be used as a blade flap restrainer.

It is a further object of this invention to provide a rotor pitch control mechanism which automatically provides stabilizing pitch-flap coupling.

These and other objects of the invention will become more readily apparent from the ensuing specification when taken with the drawings.

DESCRIPTION OF THE PREFERRED EMBODIMENT

Figure 1:
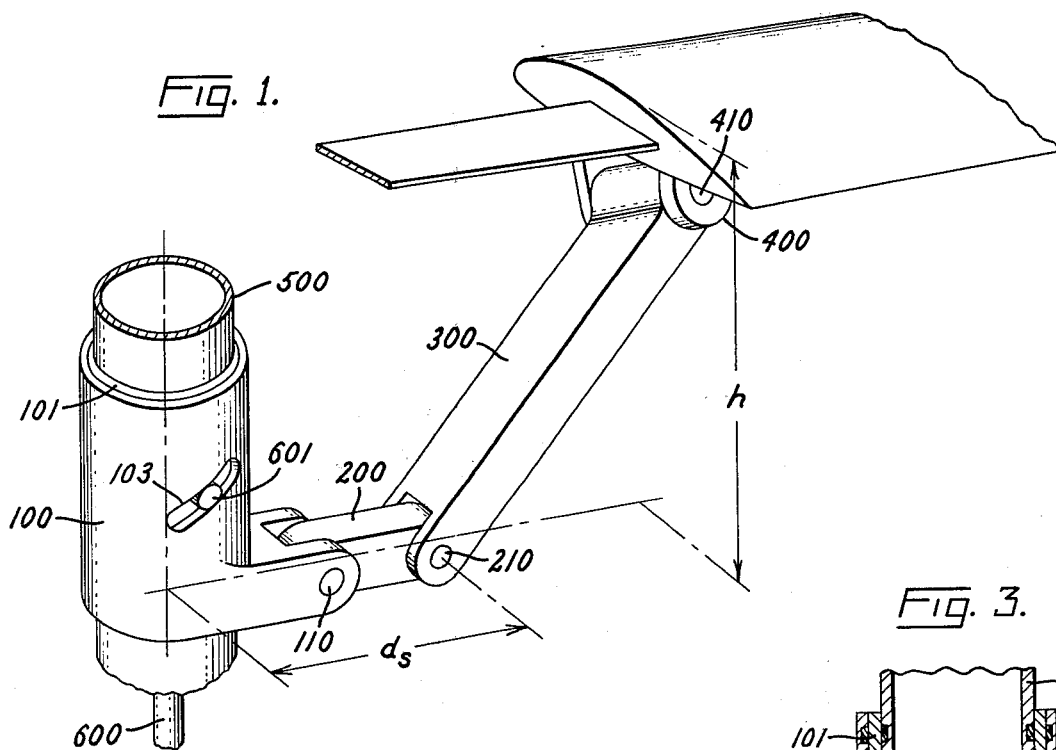
FIG. 1 is a perspective view of the invention used in conjunction with a strapped rotor.
Figure 3:
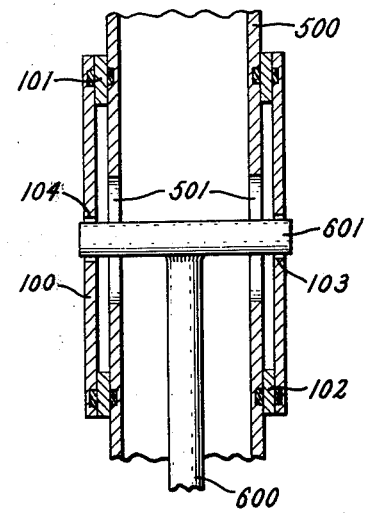
FIG. 3 is a perspective view of the slider; spider pins; and rotor shaft.

Referring to FIG. 1 of the drawings, the invention consists of a slider 100, two intermediate links 200 and 300, and a clevis fitting 400. The slider 100 contains bearings 101 and 102, shown in FIG. 2 at each end of the slider which allows the slider to rotate about the outer portion of the rotor shaft 500.

Figure 2:
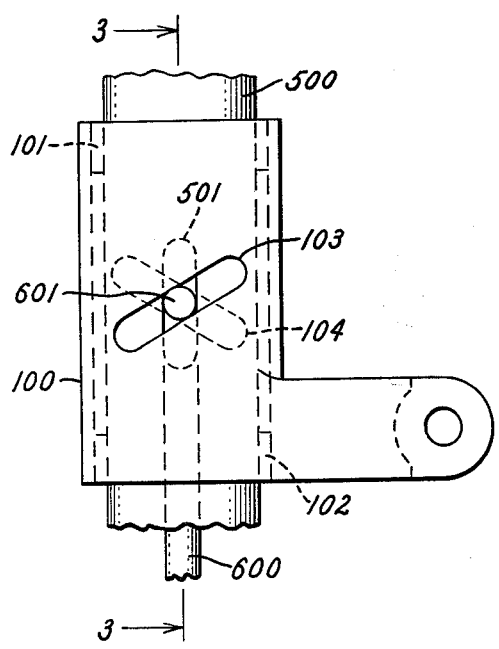
FIG. 2 is a detail view of a slider.

The slider rotation is produced in response to the linear motion of spider 600, which moves along the axis of the rotor shaft 500, guided by a longitudinal slot 501 in the rotor shaft. Thrust bearings 101 and 102 allow the slider 100 to rotate about the rotor shaft 500, while preventing motion along the axis of the rotor shaft in response to the linear motion of spider pins 601. As shown in FIG. 2, the spider pin 601 motion in the slider 100 is limited by diagonal slots in the slider 103 and 104. As illustrated, two diagonal slots may be used, in conjunction with two spider pins, but, of course, it would be possible to use only one slot and spider pin or more than two.

When an axial load is applied to the spider rod 600, spider pins 601 bear against the diagonal slots 103 and 104 providing a torque about the rotational axis of the rotor shaft 500 in the slider 100. This torque is then applied by the slider 100 to intermediate link 200 through the hinged connection 110 as shown in FIG. 1. Link 200 connects to link 300 through universal joint 210. As will be described later, universal joint 210 is required because link 200 is restricted to vertical motion relative to slider 100, while link 300 must be able to rotate. Link 300 applies a moment to clevis fitting 400 through cocked hinge 410, shown in FIG. 4, to change the pitch of the rotor blade, (a pitch change of the rotor blade means that the rotor blade is rotated about its longitudinal axis, which alters the aerodynamic thrust of the rotor blade).

The resultant pitching moment of the rotor blade can be computed as follows:

$$M_t = \frac{M_o}{N} \times \frac{h}{d_s}$$

where: $M_t$ is the pitching moment applied to a rotor blade; $M_o$ is the total torque produced about the rotor shaft longitudinal axis by the spider pins 601; $N$ is the number of reacting rotor blades' $h$ is the vertical distance, as shown in FIG. 1, between the pitch axis of the blade and hinge 110, and; $d_s$ as shown in FIG. 1, is the radial distance from the longitudinal axis of the rotor shaft 500 and hinge pin 210.

The applied load to the spider necessary to produce a desired blade pitch moment can be varied by varying the geometry of the pitch change linkages. For example, to the extent that it is possible to move the blade root end toward the rotor shaft (other rotor design constraints come into play in this determination) $d_s$ can be decreased and the necessary spider load decreased. Or, another way to reduce spider loads is to increase $h$, while holding $d_s$ constant. Accordingly, it is an important feature of this invention that the general design can be tailored to specific spider load requirements.

Figure 5:
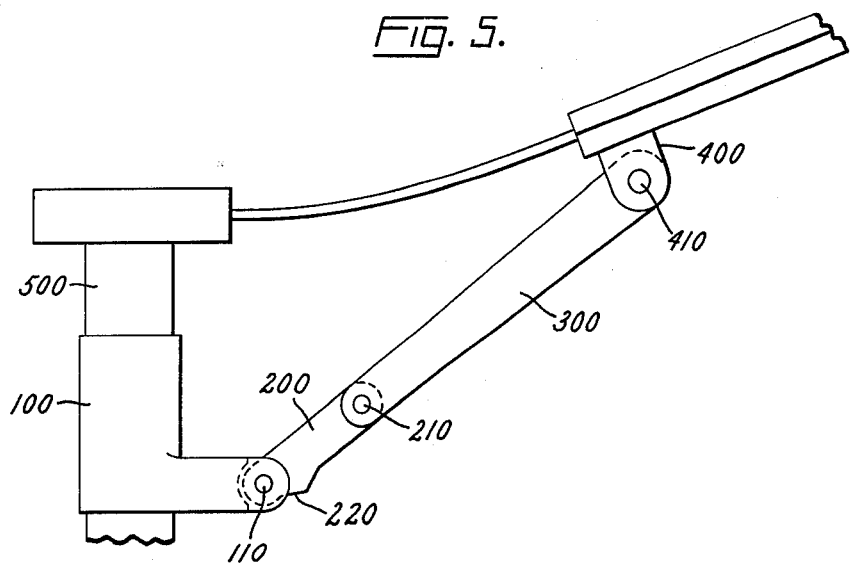
FIG. 5 is a view of the linkage with the rotor blade in the up position.
Figure 6:
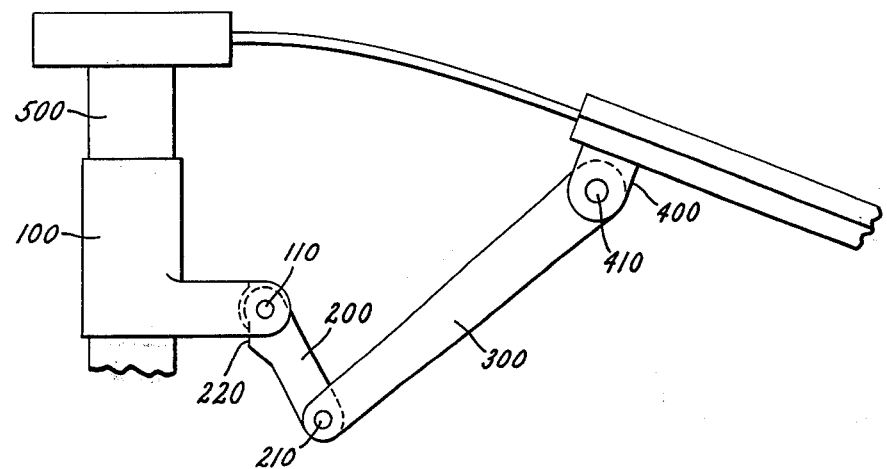
FIG. 6 is a view of the linkage, illustrating the function of the limit-motion stop.

Universal joint 210 allows for rotation of the blade even though link 200 is restricted to vertical motion. It is possible to restrict the allowable vertical motions of link 200 by employing motion stop 220 on the end of link 200 as shown in FIGS. 5 and 6. Travel of the blade root end upward is limited by the length of links 200 and 300, as shown in FIG. 5. Droop of the blade is limited by motion stop 220, as shown in FIG. 6. This is an advantage of this invention, in that by employing motion stops in the linkage a built-in flap restraint is provided which otherwise would require additional hardware and complexity in the rotor system.

Figure 7:
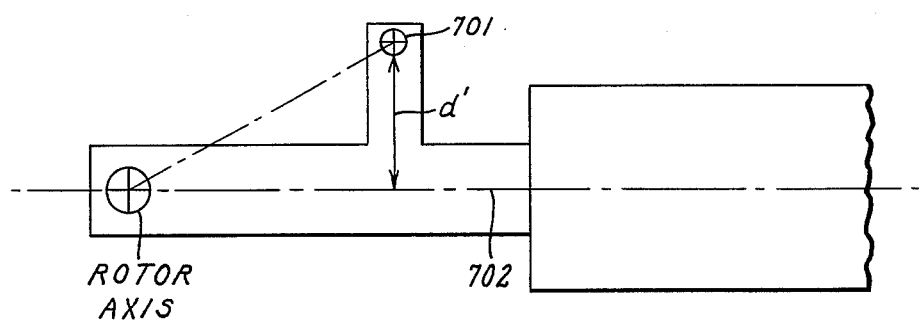
FIG. 7 is a plan view of a conventional pitch-flap coupling design.

Blade flapping motions (vertical motions of the blade root ends) must be suppressed to limit rotor blade bending loads. This can be achieved by so orienting the pitch change linkage that it automatically provides a restoring moment if the rotor blade moves vertically. For example, if the rotor blade starts to move vertically upward, the control linkage automatically decreases the thrust of the blade, thus providing a restoring moment to the rotor system. This is an example of positive pitch-flap coupling. There are various well-known techniques to produce positive pitch-flap coupling, many of which require location of the pitch link attachment point on the rotor blade as shown in FIG. 7 to produce the restoring moment. The pitch link attachment point 701 is displaced a distance d from the pitch axis, 702 of the rotor blade, to produce the restoring moment.

Figure 4:
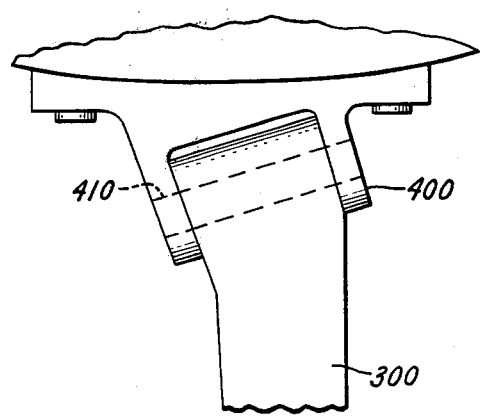
FIG. 4 is a detailed view of the cocked hinge attachment to a rotor blade.

In the present invention, positive pitch-flap coupling is achieved by the use of a cocked hinge, as shown in FIG. 4. The hinge pin, 410, axis is set at an angle with the center line of the chord of the rotor 166. When the thrust of the blade increases, and the blade starts to move vertically upward, the cocked hinge imparts a restoring pitch moment to the blade, lessening its thrust.

It will be apparent to those skilled in the art that various modification and variations could be made in the apparatus constituting this invention without departing from the scope and spirit of the invention.

What is claimed is:

1. A blade pitch control mechanism for use with a rotor blade which comprises:
   a. a tubular slider mounted externally concentric to a rotor shaft;
   b. thrust bearings mounted at each end of said slider between said rotor shaft and said slider which allow the slider to rotate about the rotor shaft while constraining longitudinal motion of the slider along the axis of the rotor shaft;
   c. actuating means to cause rotation of said slider about said rotor shaft;
   d. linkage means connecting said slider to a fixed attachment on the rotor blade to transmit control forces in response to rotation of the slider to the fixed attachment to change the pitch of the rotor blade, comprising:
      1. a control arm fixedly mounted on the outside of the slider;
      2. a first intermediate link, hinge-mounted to the control arm on one end;
      3. a second intermediate link connected on one end through a universal joint to the first intermediate link and hingedly connected on the other end to the fixed attachment on the rotor blade.

2. The apparatus according to claim 1 wherein the fixed attachment is a clevis fitting.

3. The apparatus according to claim 1 wherein motion limitation means limit the travel of the first and second intermediate links, to provide a flap restraint capability.

4. The apparatus according to claim 2 wherein the clevis fitting is cocked to produce positive pitch-flap coupling.

* * * * *